UNITED STATES PATENT OFFICE.

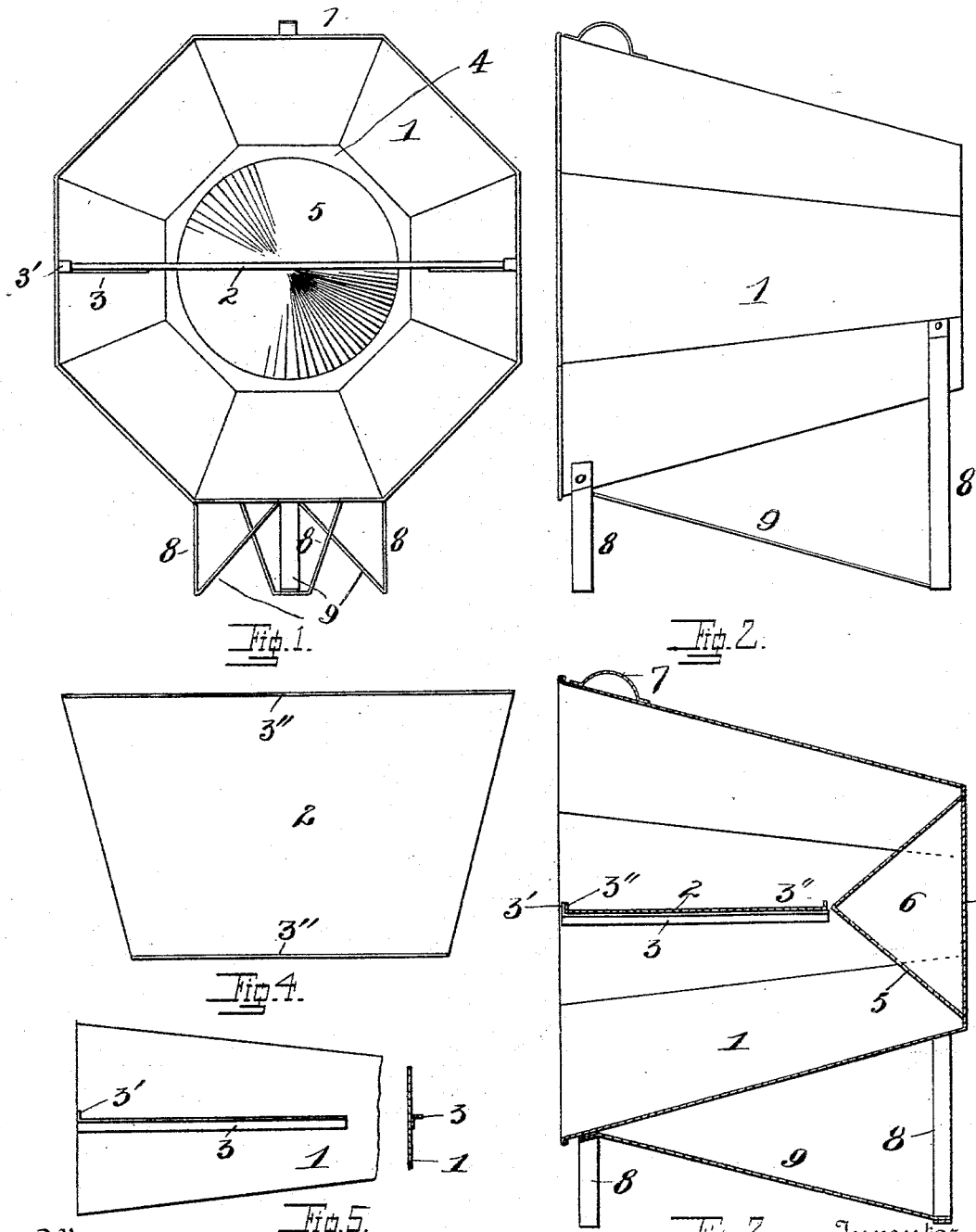

DANIEL P. HOLLAND, OF EDGEWOOD, GEORGIA.

OVEN.

SPECIFICATION forming part of Letters Patent No. 593,098, dated November 2, 1897.

Application filed February 7, 1896. Serial No. 578,439. (No model.)

*To all whom it may concern:*

Be it known that I, DANIEL P. HOLLAND, a citizen of the United States of America, and a resident of Edgewood, in the county of De Kalb and State of Georgia, have made certain new and useful Improvements in Ovens; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to devices in which articles may be heated and cooked by boiling, baking, or roasting, the object being to provide a device of this class which may derive its heat from an open fire, and by centralizing said heat in a proper manner apply the heat to the end above specified.

In the accompanying drawings, Figure 1 is a front view of the device, same being a view of the side thereof facing toward the grate or fireplace when the device is in use. Fig. 2 is a side elevation thereof. Fig. 3 is a vertical longitudinal section. Fig. 4 is a plan view of the pan or shelf; and Fig. 5 is a fragmentary elevation and cross-section of the inner side of the casing, showing the flange whereon one edge of the said pan or shelf rests.

In the figures like reference-characters are uniformly employed in the designation of corresponding elements of construction.

1 is a casing, which is made in the form of a hollow truncated pyramid, presenting a large opening at the front and tapering smaller backwardly to the desired point and at an angle best adapted to reflect the heat upwardly, downwardly, and laterally against the article being heated or the receptacle containing same. The interior of this casing is polygonal in cross-section. If this casing 1 were made circular in cross-sectional contour, the heat-rays reflected from different points would be concentrated upon the vertex and would hence, in baking especially, heat one part of the article to a very much greater degree than another, thus scorching one part long before the other part would be cooked. This point of convergent heat-rays is extremely small in such cases, and where the circular casing is conical the heated point consists simply of the line extending axially of the cone. In order to obviate this difficulty, I make the casing polygonal, it being shown octagonal in the drawings. It is hence obvious that the heat reflected from the faces so formed will spread over considerable area, and while they would centralize on a pan or other cooking utensil placed upon the shelf 2 the area of concentration would be very much larger than it would be in the case just mentioned.

The shelf 2 rests upon flanges 3, secured to the horizontal sides of the casing. Hence it is easily removable, small flanges 3' being bent up at the front ends of said flanges to prevent an accidental displacement of said shelf. Flanges 3'' stiffen the pan. The small end of the casing is closed by means of a plate 4, and secured to the inner side of this plate, in any suitable manner, is a conical reflector 5, its apex coinciding with the axis of the casing 1. This provides a dead-air space 6, which insulates the end of the casing 1 partially against radiation and thus holds more heat within the casing, and also reflects forwardly against the pan a portion of the heat, which would otherwise be thrown against the plate 4, the remainder of said heat lost being reflected back and forth from said cone 5 to the faces of the casing 1, and vice versa, until it is thrown against the surface of the article being heated, which, being non-reflective, absorbs the heat.

7 is a handle, of which there may be as many as desired, and 8 are legs, which should be of such form and number as will best support the casing 1 from the surface upon which it is to be set, a brace or braces 9 being employed for the sake of stiffness, if desired.

Having thus described my invention, what I claim as new, and desire to secure by Letters Patent of the United States, is—

In an oven of the character described, the combination with a casing in the form of a hollow truncated pyramid, the interior walls of said casing being polygonal in cross-section, of a plate closing the smaller end of said casing, a hollow metal cone projecting from the closed end of said casing into the interior thereof, forming an air-space between the sides of said cone and the plate which closes the end of said casing, a support for the article to be cooked mounted inside of said casing and coinciding approximately with the horizontal axis thereof and means for supporting said oven, substantially as described.

In testimony whereof I hereunto affix my signature in presence of two witnesses.

DANIEL P. HOLLAND.

Witnesses:
A. P. WOOD,
M. BROWN.